United States Patent
King, Jr.

(10) Patent No.: US 9,463,546 B1
(45) Date of Patent: Oct. 11, 2016

(54) SYSTEM AND METHOD FOR DISSIPATING HEAT FROM A ROTARY POWER TOOL

(71) Applicant: Jack M. King, Jr., Phoenix, AZ (US)

(72) Inventor: Jack M. King, Jr., Phoenix, AZ (US)

(73) Assignee: Skitter & Squirt Adventures, LLC., Missoula, MT (US)

( * ) Notice: Subject to any disclaimer, the term of this patent is extended or adjusted under 35 U.S.C. 154(b) by 708 days.

(21) Appl. No.: 13/862,025

(22) Filed: Apr. 12, 2013

Related U.S. Application Data

(63) Continuation-in-part of application No. 13/086,334, filed on Apr. 13, 2011, now Pat. No. 8,793,835, and a continuation-in-part of application No. 13/309,037, filed on Dec. 1, 2011, now abandoned, and a continuation-in-part of application No. 13/691,408, filed on Nov. 30, 2012, now Pat. No. 8,578,554, and a continuation-in-part of application No. 13/691,461, filed on Nov. 30, 2012, now Pat. No. 9,301,664, and a continuation-in-part of application No. 13/836,275, filed on Mar. 15, 2013, now abandoned.

(51) Int. Cl.
  *B24B 7/18* (2006.01)
  *B24B 55/10* (2006.01)
  *B24B 37/015* (2012.01)

(52) U.S. Cl.
  CPC ............. *B24B 7/186* (2013.01); *B24B 37/015* (2013.01); *B24B 55/102* (2013.01)

(58) Field of Classification Search
  CPC ..... B24B 23/028; B24B 23/02; B24B 55/02; B24B 55/10; B24B 55/102
  USPC ................ 451/353, 350, 488, 456, 449, 359
  See application file for complete search history.

(56) References Cited

U.S. PATENT DOCUMENTS

| | | | |
|---|---|---|---|
| 1,872,602 A | * | 8/1932 | Olsen ................... A47L 11/1625 15/29 |
| 3,368,341 A | | 2/1968 | Goebel |
| 4,192,104 A | | 3/1980 | Patenaude |
| 4,360,947 A | | 11/1982 | De Cosa et al. |
| 4,747,178 A | | 5/1988 | Breitbach |
| 5,125,190 A | | 6/1992 | Buser et al. |
| 5,228,244 A | | 7/1993 | Chu |
| 5,440,809 A | | 8/1995 | Padilla |
| 5,545,082 A | | 8/1996 | Courson et al. |
| 5,791,979 A | | 8/1998 | Duncan et al. |
| 5,833,524 A | | 11/1998 | Satoh et al. |
| 5,885,144 A | * | 3/1999 | Martin ..................... B24D 9/08 451/356 |
| 6,027,399 A | | 2/2000 | Stewart |
| 6,065,633 A | | 5/2000 | Abbey |

(Continued)

*Primary Examiner* — Monica Carter
*Assistant Examiner* — Lauren Beronja
(74) *Attorney, Agent, or Firm* — Lisa Foundation Patent Law Clinic at Arizona State University

(57) ABSTRACT

A device for dissipating heat from a rotary power tool is disclosed. The rotary power tool comprises a hollow disc housing. On the top planar surface of the hollow disc housing, a plurality of hollow bolts traverse the surface of the hollow disc housing into the interior of the hollow disc housing. In the interior of the hollow disc housing, the hollow bolts create a substantially angled plane relative to the top planar surface of the hollow disc housing. The hollow disc housing encloses a heatsink. When the heatsink spins, it creates a vacuum, thereby drawing exterior air through the hollow bolts. The angled plane created by the hollow bolts directs the flow of air through the heatsink. The combination of the heatsink and the directed air flow serves to cool the rotary power tool and prevent overheating.

15 Claims, 4 Drawing Sheets

(56) References Cited

U.S. PATENT DOCUMENTS

| | | |
|---|---|---|
| 6,079,078 A | 6/2000 | Byington |
| 6,514,131 B1 | 2/2003 | Reich et al. |
| 6,540,305 B2 | 4/2003 | Phillips |
| 6,540,598 B1 | 4/2003 | McCutchen |
| 6,641,634 B2 | 11/2003 | Reich et al. |
| 6,854,937 B1 | 2/2005 | Weiss |
| 6,928,691 B2 | 8/2005 | Freeman |
| 7,281,886 B2 | 10/2007 | Stoerig |
| 7,380,343 B2 | 6/2008 | Yoshimura et al. |
| 7,628,102 B2 | 12/2009 | Kamiya et al. |
| 7,740,086 B2 | 6/2010 | Bleicher et al. |
| 7,797,794 B2 | 9/2010 | Bleicher et al. |
| 8,133,094 B2 | 3/2012 | Loveless et al. |
| 8,137,165 B2 | 3/2012 | Loveless et al. |
| 2006/0179985 A1 | 8/2006 | Bohne et al. |
| 2007/0028416 A1 | 2/2007 | Dunkel et al. |
| 2007/0193759 A1 | 8/2007 | Sweig et al. |
| 2010/0242216 A1 | 9/2010 | MacNaughton |
| 2010/0243656 A1 | 9/2010 | Nazarian |

* cited by examiner

SYSTEM AND METHOD FOR DISSIPATING HEAT FROM A ROTARY POWER TOOL

CROSS REFERENCE TO RELATED APPLICATION

This application is a continuation-in-part of and claims priority to U.S. patent application Ser. No. 13/836,275 titled "System and method for capturing dust created by rotary tool attachments," filed Mar. 26, 2013 by Jack M. King, Jr.; U.S. patent application Ser. No. 13/086,334, titled "System and method for capturing resultant dust from power tool operation," and filed on Apr. 13, 2011 by Jack M. King, Jr.; U.S. patent application Ser. No. 13/309,037, titled, "Vacuum device for capturing dust within a receptacle," filed on Dec. 1, 2011 by Jack M. King, Jr.; U.S. patent application Ser. No. 13/691,408, titled, "System and method for capturing dust from power tool operation," filed on Nov. 30, 2012 by Jack M. King, Jr. and U.S. patent application Ser. No. 13/691,461, titled, "System and Method for Capturing Dust from Debris Transportation," filed on Nov. 30, 2012 by Jack M. King, Jr. The contents of the above mentioned applications are hereby incorporated by reference.

BACKGROUND OF THE INVENTION

1. Field of the Invention

The present disclosure relates to a system and method of heat dissipation for rotary power tools.

2. Description of Related Art

The removal of thin-set mortar associated with the removal to flooring tile is a time consuming and difficult process. During the remodeling process, after flooring tile is removed, a hard and uneven layer of thin-set mortar remains adhered to the surface of the floor. The thin-set must be removed and the surface must be leveled before a new flooring tile or any type of flooring may be installed. The removal of thin-set mortar may be performed by the laborious process of an individual using a chisel and hammer. Rotary power tools such as floor grinders have made the process of thin-set mortar removal and concrete grinding faster and more convenient. However, the use of rotary power tools presents its own set of difficulties due to inherent shortcomings in the structure of the rotary power tools.

The current state of the art has several deficiencies. First, if the rotary power tool utilizes dry grinding, the tool often experiences overheating due to the friction between the grinding disc and the thin-set mortar. Also, once the thin-set mortar has been removed, there could also be additional dry grinding needed to remove high spots in the existing concrete, resulting in additional heat and friction from those other concrete and/or cementious grinding activities. Overheating of the rotary tool may lead to several other problems such as (1) malfunction of the grinding disc, (2) failure of the rubber bushings used to stabilize the grinding disc, and (3) downtime between uses to cool the rotary power tool. Malfunction of the grinding disc may be caused from overheating because the heat may change the surface of the grinding disc, thereby limiting its abrasive efficiency. Failure of the rubber bushing used to stabilize the grinding disc may be caused by overheating because the heat compromises the structure of the rubber bushings, thereby preventing the rubber bushing from stabilizing the grinding disc. Downtime between uses of the rotary power tool is increased due to overheating because in order to prevent prolonged overheating, the rotary power tool must be cooled to an acceptable level between uses.

Second, while the current state of the art may use wet grinding to prevent overheating of the rotary power tool, when using rotary power tools that utilize wet grinding, the user must deal with the by-product of water and thin-set waste and increased project times. Wet grinding produces a waste product of thin-set mortar and water that is difficult to clean and dispose. Wet grinding also increases the overall project time of tile removal and replacement because a user must wait until the surface is completely dry and clean in order to continue with the installation of new flooring, coating, or topping.

Third, rotary power tools experience problems with grinding disc balance and levelness along with excess vibration due to a lack of sufficient internal structural support. These problems make rotary power tools more difficult to operate and also make the process of removing thin-set mortar and concrete grinding less efficient.

So as to reduce the complexity and length of the Detailed Specification, and to fully establish the state of the art in certain areas of technology, Applicant(s) herein expressly incorporate(s) by reference all of the following materials identified in each numbered paragraph below.

U.S. Publication No. 2006/0179985 discloses a rotary power tool which is cooled by a flow of air across an electric motor. The electric motor is accommodated within a housing of the rotary tool. The housing has an air inlet opening and a spiral air passage which is directed in the opposite direction of the rotary power tool.

U.S. Pat. No. 7,628,102 discloses a circular saw which is cooled by air flow across a blade case. The circular saw has a cooling air guide which introduces air into the blade case.

U.S. Pat. No. 7,380,343 discloses a circular saw which is cooled by air flow into a main body of the circular saw. Air flow is introduced into the main body of the circular saw through an air inlet and the air flows through a dust collection route and over a cutting blade.

U.S. Pat. No. 6,540,305 discloses an electric floor covering removal apparatus which is cooled by air created from an electric fan.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

BRIEF SUMMARY OF THE INVENTION

This summary is provided to introduce a selection of concepts in a simplified form that are further described below in the detailed description. This summary is not intended to identify key or essential features of the claimed subject matter, nor is it intended to be used as an aid in determining the scope of the appended claims.

The present invention provides among other things a system and method for dissipating heat buildup from a rotary power tool through guided air flow through the rotary power tool and a heatsink which absorbs and releases heat.

In one embodiment, the invention is a floor grinder. The floor grinder includes a main frame, a hollow disc housing, a rotary drive shaft, a heatsink, a grinding disc, and a mounting plate. There is a plurality of bolts which pass through the top of the hollow disc housing and into the interior space of the hollow disc housing. The rotary drive shaft extends axially through the hollow disc housing. The heatsink is coupled to the rotary drive shaft, the grinding disc is coupled to the rotary drive shaft, and the mounting plate is coupled to the drive shaft and is located between the heatsink and the grinding disc.

In addition, the plurality of bolts forms a substantially angled plane relative to the top of the hollow disc housing inside the interior of the hollow disc housing. The plurality of bolts is configured to allow air to pass through the bolts and into the interior space of the hollow disc housing. The heatsink comprises a substantially circular base and a substantially circular body which extends from the circular base. The circular body of the heatsink comprises a plurality of fins that extend outwardly from the circular body. At least a portion of fins among the plurality of fins is substantially parabolic. The heatsink's circular body also comprises a plurality of openings which have substantially elliptical circumferences. The heatsink is also configured to stabilize the mounting disc and grinding disc within the hollow disc housing in a manner that a grinding surface of the grinding disc remains substantially parallel to a work surface. Finally, the substantially angled plane formed by the plurality of bolts is configured to direct the exterior air in the direction of a heatsink's spin.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶F. Thus, the use of the words "function," "means" or "step" in the Detailed Description or Description of the Drawings or claims is not intended to somehow indicate a desire to invoke the special provisions of 35 U.S.C. §112, ¶F, to define the invention. To the contrary, if the provisions of 35 U.S.C. §112, ¶F are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶F. Moreover, even if the provisions of 35 U.S.C. §112, ¶F are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1A:
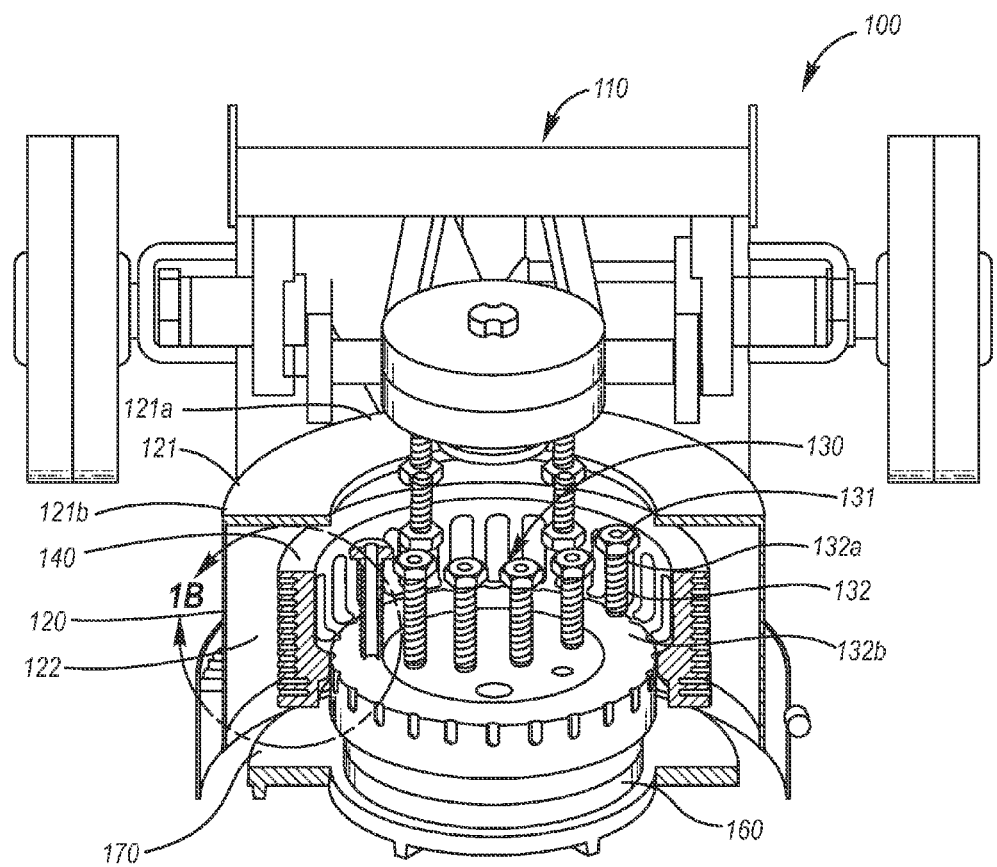
FIG. 1A depicts a sectional front view of an embodiment of the invention.
Figure 1B:
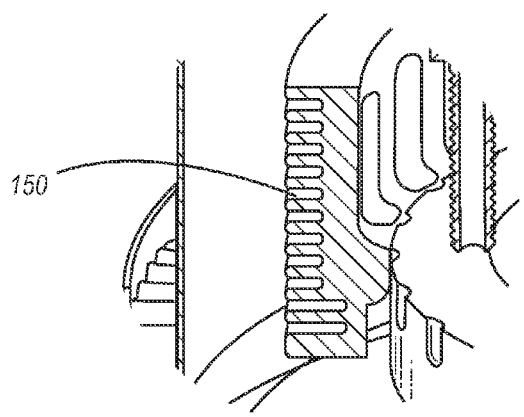
FIG. 1B depicts a close-up view of an implementation of a plurality of fins of a heatsink as indicated in FIG. 1A.

Referring to FIG. 1A, a sectional front view of a device 100 for dissipating heat from a rotary power tool is illustrated according to an embodiment of the invention and FIG. 1B, a close-up view of an implementation of a plurality of fins of a heatsink as indicated in FIG. 1A. The device 100 is coupled to a main body 110 of a rotary power tool. The device 100 comprises a hollow disc housing 120 that may have a substantially cylindrical body and a substantially planar top surface 121. The substantially planar top surface 121 has a back section 121a and a front section 121b, where the back section is closest to the main body 110 and the front section is farthest from the main body 110. A plurality of bolts 130 traverses the front section of the substantially planar top surface 121 and at least a portion of the plurality of bolts 130 extends into the interior negative space of the hollow disc housing 122. A bolt head 131 sits substantially adjacent to the substantially planar top surface 121. The bolt body 132 has a first end 132a and a second end 132b. In some embodiments, a hollow opening traverses the entire length of the bolt, beginning at the bolt head 131 and continuing through the bolt body 132. In some embodiments, all bolts among the plurality of bolts 130 may comprise a hollow opening running the entire length of each bolt; however, in other embodiments, a portion of the plurality of bolts 130 may comprise a hollow opening and the remaining bolts may comprise a solid body or any other composition which is known to one having ordinary skill in the art. The second end of the bolt body 132b extends into the interior negative space of the hollow disc housing 122. The plurality of bolts 130, each having a second end of the bolt body 132b may be of varying lengths from each other. In one embodiment, the varying lengths of the bolt bodies 132 create a substantially angled plane relative to the substantially planar top surface 121 of the hollow disc housing 120. The substantially angled plane may be of any angle, from 1 degree to 180 degrees. A heatsink 140 is coupled to the main frame 110 and is housed within the hollow disc housing 120. The body of the heatsink 140 has an interior end and an exterior end. The exterior body of the heatsink 140 comprises a plurality of fins 150. The heatsink 140 is coupled to a mounting plate 160 and a grinding disc 170, such that the mounting disc 160 is located between the heatsink 140 and the grinding disc 170.

The hollow disc housing 120 may be any size or shape capable of coupling to a main body 110 of a rotary power tool. The hollow disc housing 120 may be larger if it is to be coupled to a larger rotary power tool and conversely, it may be smaller if it is coupled to a smaller rotary power tool. The hollow disc housing 120 may be configured to allow the following: a plurality of bolts 130 to traverse the substantially planar top surface 121, the housing of the heatsink 140, and the coupling of the hollow disc housing 120 to the main frame 110. In some embodiments, the hollow disc housing 120 may be cylindrical, rectangular, or trapezoidal. The hollow disc housing 120 may be comprised of a variety of materials, including metals, metalloids, alloys, woods, and plastics.

In some embodiments, the plurality of bolts 130 may comprise any number of bolts greater than two bolts. The plurality of bolts 130 may be comprised of a variety of materials, including metals, metalloids, alloys, woods, and plastics. The second end of the bolt body 132 may be either shorter or longer than the second end of the adjacent bolt body 132 to create a substantially angled plane relative to the substantially planar top surface 121 of the hollow disc housing 120. The hollow opening that traverses the bolt from the bolt head 131 and through the bolt body 132 may be of any size or shape configured to allow passage of air from the exterior of the hollow disc housing 120 into the interior negative space of the hollow disc housing 122. In one embodiment, the heatsink 140 is configured to spin to create a vacuum, thereby drawing air from the exterior of the hollow disc housing 120 into the interior negative space of the hollow disc housing 122 through the plurality of bolts 130. The introduction of air into the interior negative space of the hollow disc housing 122 helps to prevent the rotary power tool from overheating through the transfer of the heat from the rotary power tool to the surrounding air. As more air is introduced into the interior negative space of the hollow disc housing 122, the more heat is transferred from the rotary power tool and removed into the air. The introduction of air into the interior negative space of the hollow disc housing 122 also assists in removing dust or debris which may be present in the interior negative space of the hollow disc housing 122 because the air flow agitates any dust or debris from remaining in the interior negative space of the hollow disc housing 122. The substantially angled plane created by the second ends of the bolt bodies 132b may be configured to guide the directionality of the air flow coming from the exterior of the hollow disc housing 120, traversing through the plurality of bolts 130 and entering into the interior negative space of the hollow disc housing 122 to conform with the directionality of the spinning heatsink 140

Figure 2:
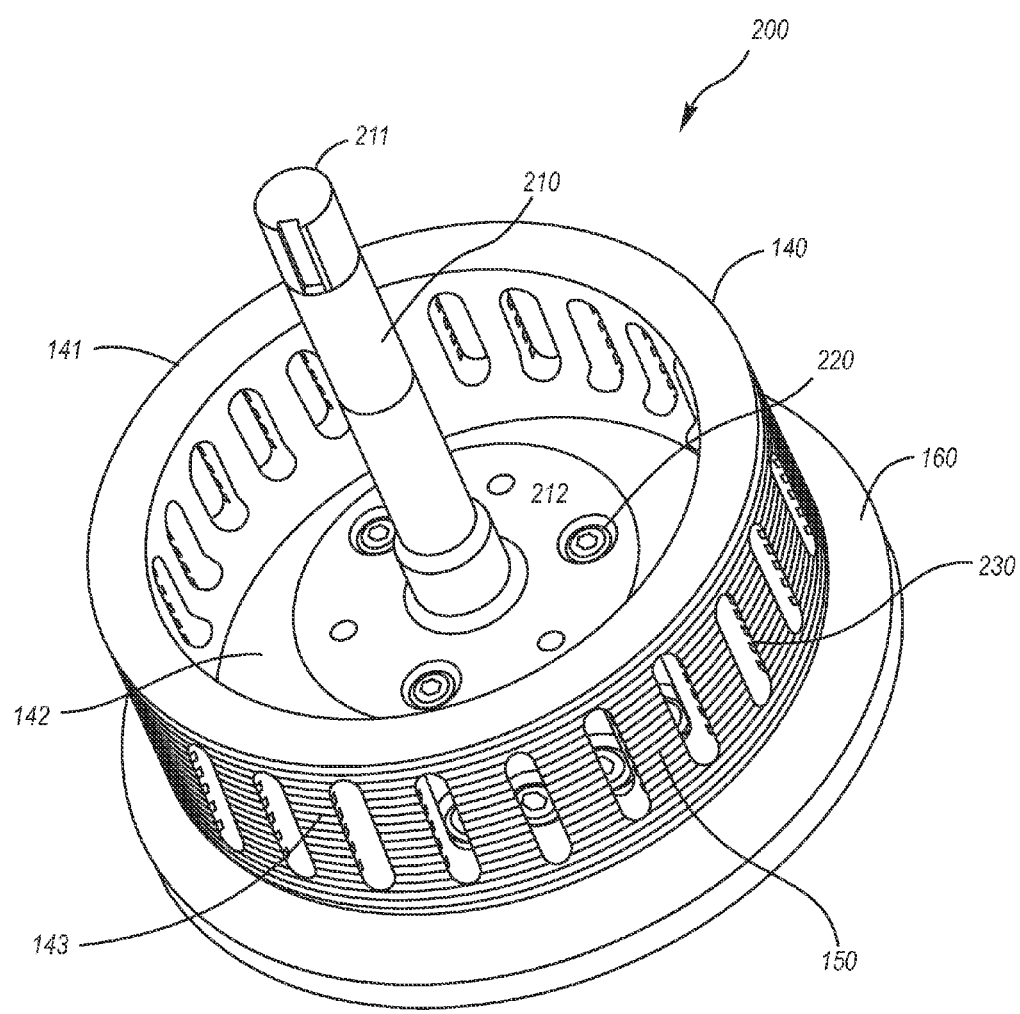
FIG. 2 depicts a top and side view of an implementation of a heat sink.

Referring to FIG. 2, a top and side view of the heatsink assembly 200 is illustrated according to an embodiment of the invention. The device comprises a rotary drive shaft 210 coupled to the heatsink 140. The heatsink 140 further comprises a top end 141, a base 142, and a body extending vertically from the base 143. The body of the heatsink 143 further comprises a plurality of fins 150 and a plurality of openings 230. In one embodiment, the rotary drive shaft 210 is coupled to the base of the heatsink 142 by a plurality of drive shaft bolts 220. The rotary drive shaft 210 coupled to the base of the heatsink 142 is further coupled to the mounting plate 160.

The rotary drive shaft 210 may be made of any durable material such as case-hardened steel, heat-treated steel, or any other material known to one of ordinary skill in the art. The rotary drive shaft stabilizes the rotary power tool and limits excess vibration caused by the grinding motion. The rotary drive shaft 210 has a first end 211 and a second end 212. The first end of the rotary drive shaft 210 is coupled to the main body 110 of the rotary power tool and the second end is coupled to the base of the heatsink 140 and the mounting plate 160, such that the heatsink 140 is located between the second end of the rotary drive shaft 210 and the mounting plate 160. The rotary drive shaft may be of any length and circumference such that the rotary drive shaft 210 is capable of being coupled to the main body 110 of the rotary power tool, the heatsink 140, and the mounting plate 160.

The heatsink 140 may be made of any material capable of conducting heat including aluminum alloy, copper, composite material, or any other material known to one of ordinary skill in the art. In some embodiments, the heatsink is cylindrical, but it may be any shape that comprises a base, a body extending vertically from the base, and top which is open. For example, in some embodiments, the heatsink 140 may be rectangular, trapezoidal, or elliptical.

The body of the heatsink 143 comprises a plurality of fins 150. The plurality of fins 150 is configured to dissipate heat by providing additional surface area to conduct heat. The plurality of fins 150 extends outward from the body of the heatsink 143. In one embodiment, at least a portion fins among the plurality of fins 150 is parabolic to help to prevent dust from settling in the plurality of fins 150. However, the plurality of fins 150 may be square, triangular, or trapezoidal.

The body of the heatsink 143 comprises a plurality of openings 230. The plurality of openings 230 allows air to flow through the body of the heatsink 143 and increase the directionality of the air flow through the body of the heatsink 143. Each opening 230 may be of any shape including elliptical, rectangular, or circular. In one embodiment, the plurality of openings 230 is elliptical. This elliptical shape may help to prevent dust from settling in the openings 230 because there are no corners for the dust to accumulate. The openings 230 may be of any size that allows air to flow through the body of the heatsink 140. The size of the openings 230 may be configured to maximize the flow of air through the heatsink 140 when the heatsink is spinning. The number of openings 230 and the spacing between the openings 230 may be of any number and distance along the body of the heatsink 140. The number of openings 230 and the distance between the openings 230 may be configured to create the maximum vacuum pressure when the heatsink 140 is spinning, which may be determined by the optimization of vacuum suction.

Figure 3:
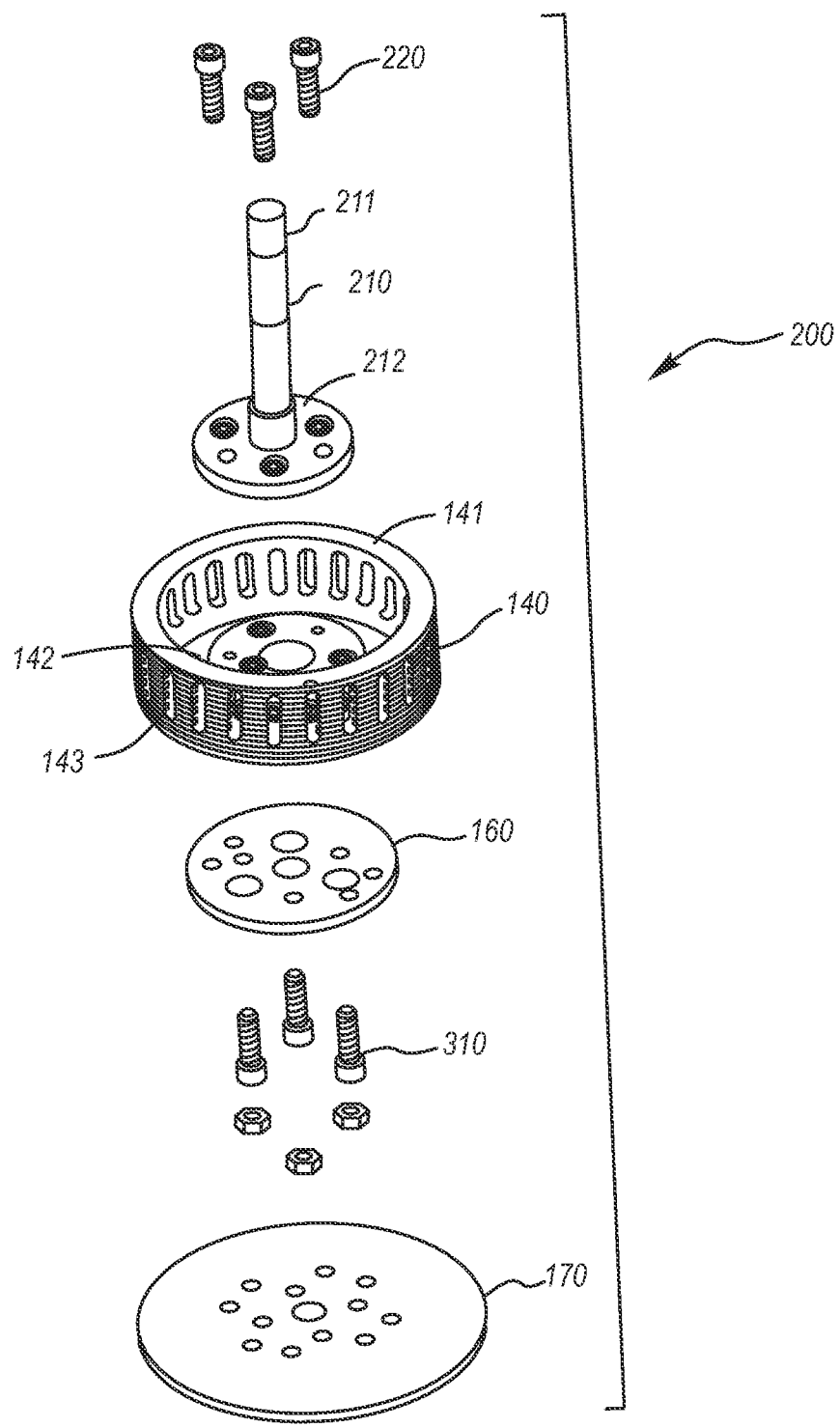
FIG. 3 depicts an exploded view of an embodiment of the invention.

Referring to FIG. 3, an exploded view of an embodiment of the heatsink assembly 200 is illustrated according to an embodiment of the invention. The heatsink assembly 200 comprises one or more drive shaft bolts 220 to couple the second end of the rotary drive shaft 212 to the heatsink 140 and the mounting plate 160. The device further comprises one or more mounting bolts 310 to couple the mounting plate 160 to the grinding plate 170, such that the mounting plate 160 is located between the heatsink 140 and the grinding disc 170.

Figure 4:
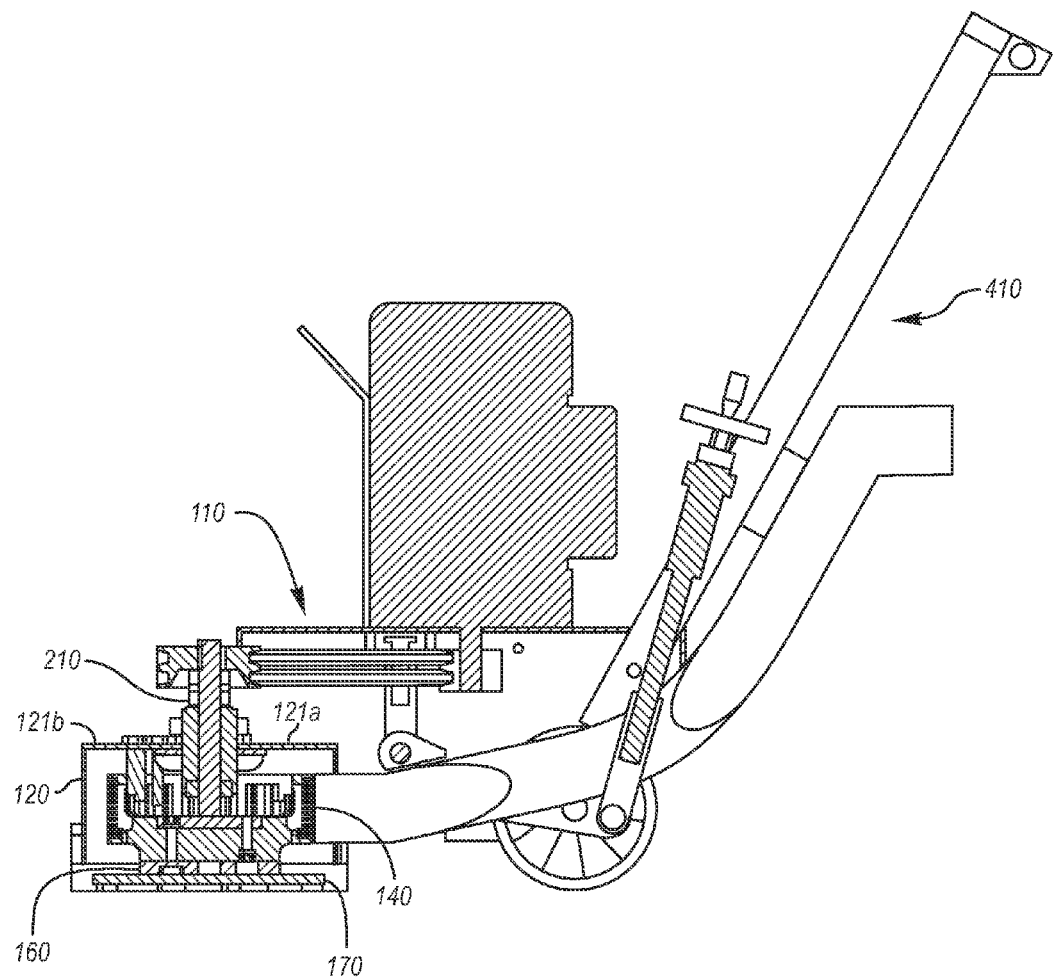
FIG. 4 depicts a sectional side view of an embodiment of the invention integrated with a floor grinder.

Referring to FIG. 4, a sectional side view of the device 100 coupled to the main body 110 of a rotary power tool is illustrated according to an embodiment of the invention. In the illustrated embodiment, the device 100 is coupled to a floor grinder 410. However, the rotary power tool may be any grinder, drill, circular saw, or rotary abrasion tool. The device 100 comprises a rotary drive shaft 210, wherein the rotary drive shaft 210 is coupled to the main body 110 of the rotary power tool. The rotary drive shaft 210 axially traverses the hollow disc housing 120 and is coupled to the heatsink 140, the mounting plate 160, and the grinding disc 170, where the heatsink 140 is located between the rotary drive shaft 210 and the mounting plate 160 and furthermore, the mounting plate 160 is located between the heatsink 140 and the grinding disc 170.

I claim:

1. A floor grinder comprising:
   a main frame;
   a hollow disc housing comprising a plurality of hollow bolts traversing a top surface of the hollow disc housing and extending into an interior space of the hollow disc housing;
   a rotary drive shaft extending axially through the hollow disc housing;
   a heatsink coupled to the rotary drive shaft;
   a grinding disc coupled to the rotary drive shaft; and
   a mounting plate coupled to the rotary drive shaft such that the mounting plate is located between the heatsink and the grinding disc,
   wherein a first end of the plurality of bolts extending into the interior space of the hollow disc housing form a substantially angled plane relative to the top surface of the hollow disc housing.

2. The floor grinder according to claim 1, wherein the plurality of bolts are configured to allow exterior air to pass into the interior space of the disc housing.

3. The floor grinder according to claim 1, wherein the heatsink comprises a substantially circular base and a substantially cylindrical body extending vertically from the circular base.

4. The substantially cylindrical body according to claim 3, wherein the substantially cylindrical body comprise a plurality of fins.

5. The substantially cylindrical body according to claim 4, wherein the plurality of fins extends outward from the substantially cylindrical body.

6. The substantially cylindrical body according to claim 4, wherein at least a portion of fins among the plurality of fins is substantially parabolic.

7. The substantially cylindrical body according to claim 3, wherein the substantially cylindrical body of the heatsink comprise a plurality of openings.

8. The substantially cylindrical body according to claim 3, wherein the plurality of openings comprise a substantially elliptical circumference.

9. The floor grinder according to claim 1, wherein the substantially angled plane formed by the plurality of bolts is configured to direct exterior air in a same direction as a direction of spin of the heatsink.

10. A floor grinder comprising:
    a main frame;
    a hollow disc housing, comprising a rotary drive shaft extending axially through the hollow disc housing;
    a heatsink coupled to the drive shaft;
    a grinding disc coupled to the rotary drive shaft; and
    a mounting plate coupled to the rotary drive shaft such that the mounting plate is between the heatsink and the grinding disc,
    wherein the heatsink comprises a substantially circular base and a substantially cylindrical body extending vertically from the circular base,
    wherein a plurality of openings comprise a substantially elliptical circumference,
    wherein a first end of the plurality of hollow bolts extending into the interior space of the hollow disc housing form a substantially angled plane relative to the tot surface of the hollow disc housing.

11. The floor grinder according to claim 10, wherein the heatsink is configured to stabilize the mounting plate and grinding disc within the hollow disc housing such that a grinding surface of the grinding disc remains substantially parallel to a work surface.

12. The substantially cylindrical body according to claim 10, wherein the substantially cylindrical body comprise a plurality of fins.

13. The substantially cylindrical body according to claim 12, wherein the plurality of fins extends outward from the substantially cylindrical body.

14. The substantially cylindrical body according to claim 12, wherein at least a portion of fins among the plurality of fins is substantially parabolic.

15. The substantially cylindrical body according to claim 10, wherein the substantially cylindrical body of the heatsink comprises a plurality of openings.

* * * * *